UNITED STATES PATENT OFFICE.

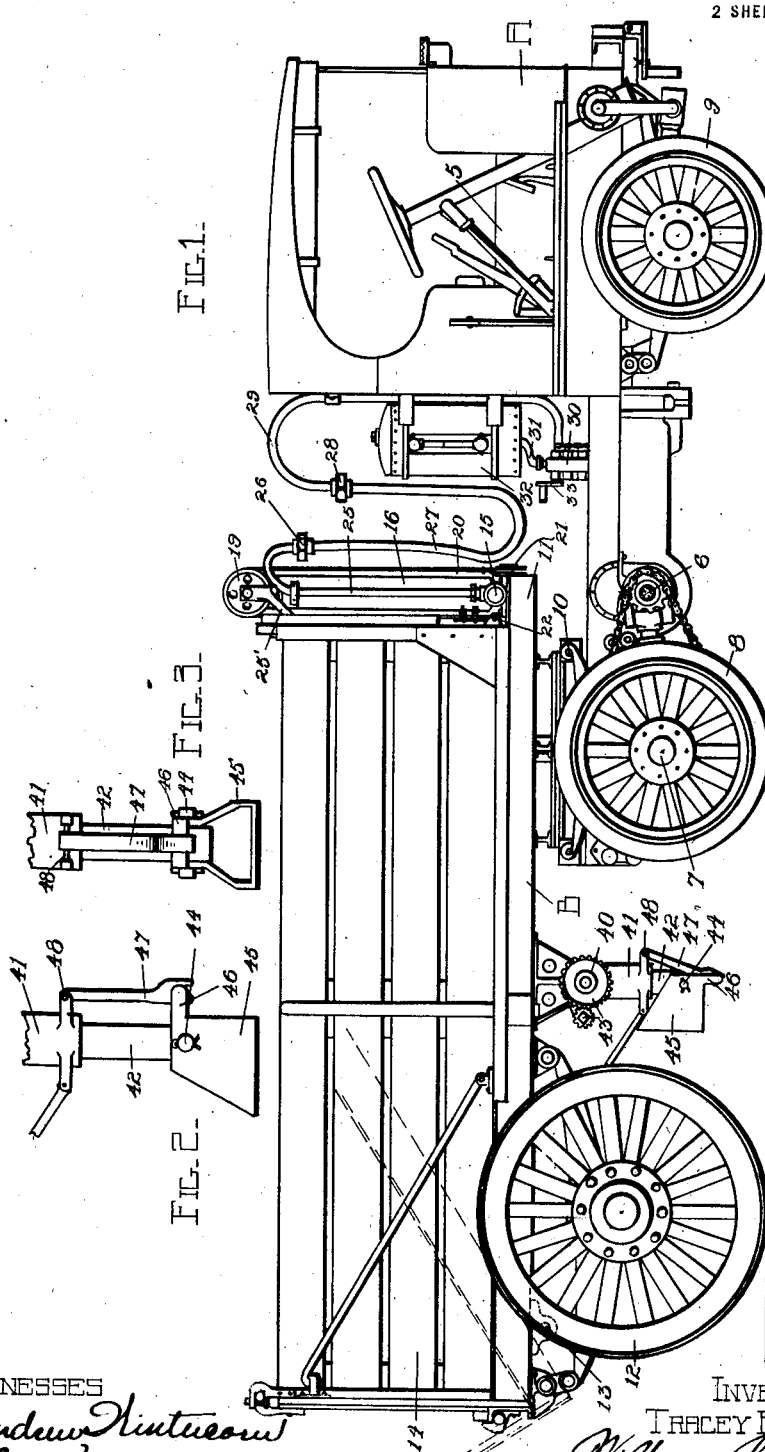

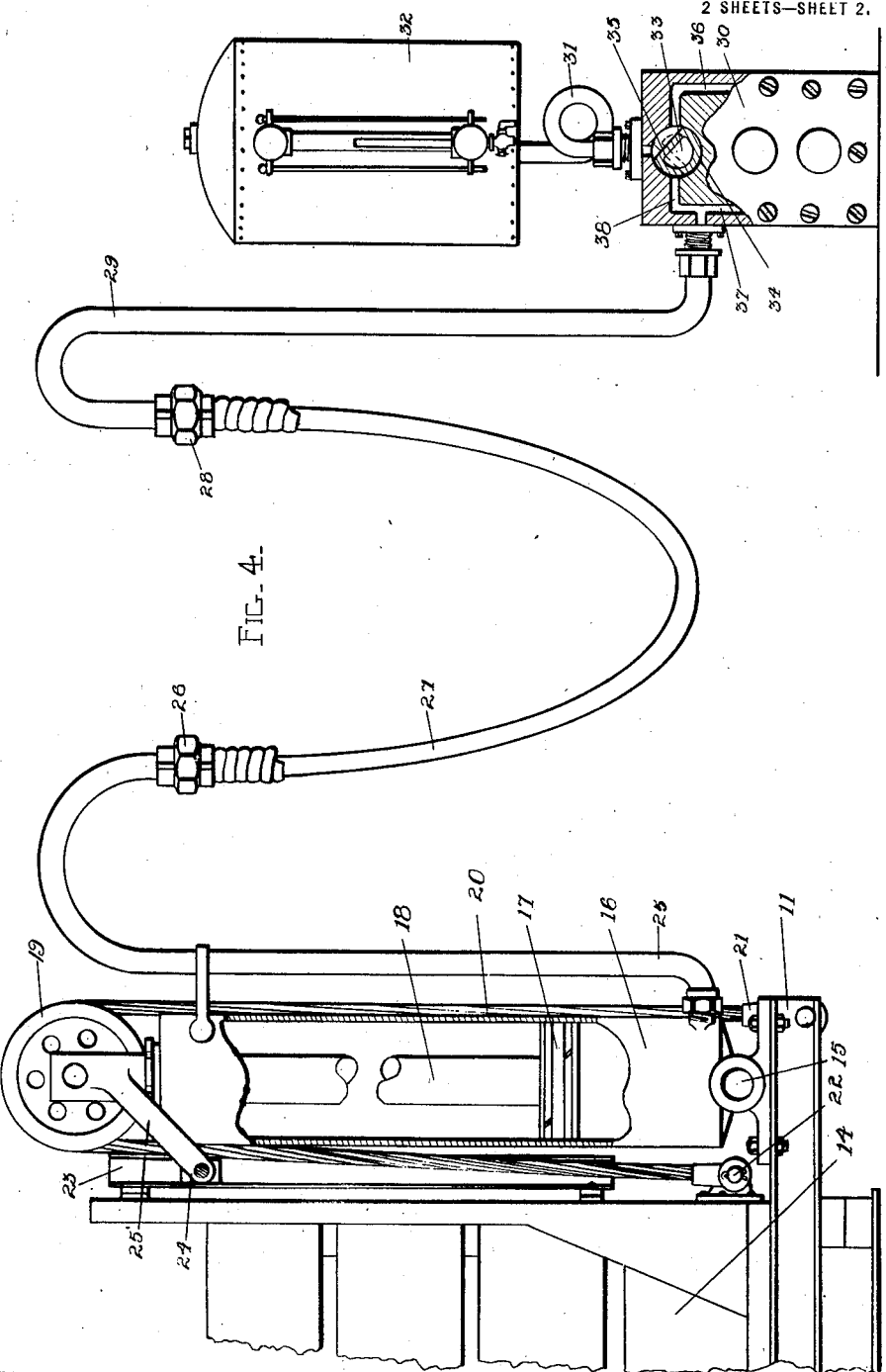

TRACEY F. BRACKETT, OF CHICAGO, ILLINOIS, ASSIGNOR TO ROBERT N. MOTHERWELL, OF CHICAGO, ILLINOIS.

TRUCK.

1,333,244. Specification of Letters Patent. Patented Mar. 9, 1920.

Application filed April 23, 1917. Serial No. 163,875.

*To all whom it may concern:*

Be it known that I, TRACEY F. BRACKETT, a citizen of the United States, residing at Chicago, in the county of Cook and State of Illinois, have invented a certain new and useful Improvement in Trucks, of which the following is a full, clear, concise, and exact description, reference being had to the accompanying drawings, forming a part of this specification.

My invention relates to trucks and is particularly concerned with trucks comprising a tractor having a trailer detachably connected therewith.

The object of my invention is to provide a novel means for elevating the forward end of a body for receiving the material to be hauled, the said body being pivotally mounted upon the frame of the trailer. In carrying out my invention I provide a hydraulic hoist which is located upon the trailer, a source of fluid for operating the hydraulic hoist, and a pump for forcing that fluid from the source into the hydraulic hoist, the source of fluid and the pump being located upon the tractor. The pump is connected with a hydraulic hoist by means of a flexible detachable connection.

These and other objects of the present invention will be pointed out more fully in connection with the accompanying drawings, wherein—

Figure 1 is a side elevational view of the truck of my invention;

Fig. 2 is a fragmentary enlarged side elevational view of the lower end of the jack in its operating position;

Fig. 3 is a front view of Fig. 2, and

Fig. 4 is an enlarged detail view of the hoisting mechanism employed for lifting the body of the trailer.

Similar characters of reference refer to similar parts throughout the several views.

Referring first to Fig. 1, A designates the tractor and B the trailer. The tractor A carries the engine or power plant 5 arranged to transmit power to the shaft shown at 6. The rear axle 7 of the tractor carries a pair of wheels, one of which is shown at 8 and the front axle a pair of wheels, one of which is shown at 9. Mounted on the rear end of the tractor A is a tilting platform 10 arranged to support the front end of the trailer B. Suitable king bolt mechanism is employed between the trailer and platform 10 so that a mechanical connection is afforded between the tractor and trailer. The mechanical connection between the trailer B and the platform 10 is such that the trailer may be detached from the tractor upon upward movement of the front end of the trailer framework. The trailer B consists of the framework 11 which carries a pair of supporting wheels, one of which is shown at 12 at its rear end. Pivoted to the framework 11 at 13 is a body or container 14, the pivotal connection being such that the contents of the body will be discharged through the rear end thereof upon movement of the front end of the body in an upward direction.

Pivoted to the front end of the frame 11 at 15 is a hoisting cylinder 16 containing a piston or plunger 17 arranged to reciprocate within the cylinder. The piston 17 is connected to the piston rod 18 which extends upwardly through the upper end of the cylinder 16 and is provided with the pulley shown at 19. A cable 20 is connected at 21 with the front end of the frame 11 and extends over the pulley 19 to the point 22 where it is attached to the lower front end of the body 14. To guide the hoisting cylinder and piston a pair of channel irons is employed one of which is shown at 23 in Fig. 4. These channel irons face inwardly toward one another and are arranged to coöperate with a suitable guide shown at 24 which is connected by the arm 25' with the upper end of the piston rod 18. Communicating with the lower end of the cylinder 16 or the head end thereof is a conduit 25 which extends upwardly and is provided with a suitable coupling shown at 26. This coupling connects with the flexible conduit 27 terminating at its front end in a coupling 28 carried by the pipe 29. The pipe 29 extends downwardly to the pumping mechanism shown at 30. Communicating with the pumping mechanism through the pipe 31 is a storage tank 32 carried by the tractor. It is to be observed also that the pumping mechanism 30 is carried by the tractor as shown in Fig. 1. Suitable mechanism is employed for operating the pump 30 from the power plant or engine shown at 5. This mechanism may be of any convenient form and requires only the use of gearing between the engine and the pump, devices being employed for mechanically connecting the pump with the engine whenever this is desired. For the sake of clearness the pipe 25 of Fig. 4 is shown in a slightly different position than that shown in Fig. 1.

Rotatably mounted within the pump casing 30 is a valve member 33 containing a convex portion 34 and a flat portion 35. When the valve assumes the position shown in Fig. 4 communication is provided between the conduit 31 and the passage 36 which leads to the pumping mechanism provided at the lower end of the casing 30. The passage 37 leads upwardly from the pumping mechanism and terminates in the pipe 29. The passageway 38 serves to afford communication between the valve member 33 and the pipe 29, this passageway being employed when the container or body 14 is lowered as will be described presently.

When the front end of the body 14 is to be lifted to discharge the contents thereof the valve 33 is moved to the position shown in full lines in Fig. 4 and the pumping mechanism connected with the power plant. Fluid in the storage tank 32 is then forced around through the pipe 31, through the valve 35, the passageway 36, through the pumping mechanism, the passageway 37, and the conduits 29, 27 and 25 into the head of the cylinder 16. As the fluid under pressure is forced under the piston 17 the latter is forced outwardly with the result that the front end of the body 14 is raised or swung upwardly about the pivot 13. When it is desired to lower the body the pump is disconnected from the power plant and the valve 33 moved to its dotted line position (Fig. 4). This position of the valve serves to provide free communication between the conduit 29 and the conduit 31 directly through the passageway 38 with the result that the weight of the body 14 serves to lower the piston and the piston in turn to force the fluid back through the several conduits into the storage tank. It will be observed from the mechanism thus far described that the fluid, which in the preferred form of my invention is oil, is forced into the cylinder on only one side of the piston so that no leakage or a very small amount of leakage can occur, and even if some of the fluid used to operate the hoisting mechanism is lost the storage tank is of such capacity that such leakage will not render the mechanism inoperative or defective in its operation. When the trailer is disconnected from the tractor the coupling 26 is turned to disconnect the flexible conduit 27 from the pipe 25.

To lift the front end of the trailer frame 11 so that it may be disconnected from the tractor and to support the front end of the trailer after such disconnection takes place I employ the jack mechanism illustrated at 40. In the preferred form of my invention this mechanism is formed by a pair of jacks one disposed on each side of the trailer and attached to the underside of the trailer as illustrated in Fig. 1. Each jack mechanism consists of two members 41 and 42, the former of which is connected to the underside of the trailer framework and the latter arranged to telescope within the former. To operate the member 42 I provide suitable gearing shown at 43. The jack mechanism thus far described forms no part of my invention and need not therefore be described and illustrated in detail. Pivoted to the lower end of the member 42 at 44 is a shoe 45 arranged when the member 42 is lowered to the position shown in Fig. 2 to assume a position such that it engages the ground. One side of the shoe 45 carries an outwardly extending arm 46 arranged to be engaged by the bifurcated end of the arm 47. This arm extends upwardly and is pivoted at 48 to the member shown at 41. When the member 42 is moved from the position shown in Fig. 2 to that shown in Fig. 1 the arm 47 operates to swing the shoe 45 rearwardly and upwardly away from the ground so as to provide the necessary clearance between the shoe and the ground.

Having thus described my invention, what I claim as new and desire to secure by Letters Patent of the United States is:

1. In a truck the combination of a tractor provided at its rear end with a supporting platform, a trailer comprising a framework, a pair of wheels for the rear end of the trailer framework, a body carried by the said trailer framework, means for detachably supporting the front end of the trailer from the tractor platform, hydraulic hoisting mechanism for lifting one end of the body to discharge the contents thereof, said mechanism comprising a cylinder and piston connected between the trailer framework and the body, a fluid storage tank mounted on the tractor, a conduit affording communication between the tank and the head of the cylinder and means for forcing the fluid from the tank to the cylinder through the conduit.

2. In a truck the combination of a tractor provided at its rear end with a supporting platform, a trailer comprising a framework, a pair of wheels for the rear end of the trailer framework, a body carried by said trailer framework, said body having its rear end pivoted to the framework, means for detachably supporting the front end of the trailer frame from the tractor platform, hydraulic hoisting mechanism for lifting the front end of the body to discharge the contents thereof, said mechanism comprising a cylinder and piston connected between the body and the trailer framework, a fluid storage tank mounted on the tractor, a conduit affording communication between the tank and the head of the cylinder, and means for forcing the fluid from the tank to the cylinder through the conduit.

3. In a truck the combination of a tractor provided at its rear end with a supporting platform, a trailer comprising a framework, a pair of wheels for the rear end of the trailer framework, a body carried by said trailer framework, means for detachably supporting the front end of the trailer frame on the tractor platform, hydraulic hoisting mechanism for lifting one end of the body to discharge the contents thereof, said mechanism comprising a cylinder and piston connected between the trailer framework and the body, a fluid storage tank mounted on the tractor, a conduit affording communication between the tank and the head of the cylinder and a pump forming a part of the conduit between the tank and cylinder for pumping fluid from the tank to the cylinder.

4. In a truck the combination of a tractor provided at its rear end with a supporting platform, a trailer comprising a framework, a pair of wheels for the rear end of the trailer framework, a body carried by said trailer framework, said body having its rear end pivoted to the framework, means for detachably supporting the front end of the trailer frame from the tractor platform, hydraulic hoisting mechanism for lifting the front end of the body to discharge the contents thereof, said mechanism comprising a cylinder and piston connected between the body and the trailer framework, a fluid storage tank mounted on the tractor, a conduit affording communication between the tank and the head of the cylinder, and a pump forming a part of the conduit between the tank and cylinder for pumping fluid from the tank to the cylinder.

In witness whereof, I hereunto subscribe my name this 20th day of April, A. D. 1917.

TRACEY F. BRACKETT.

Witnesses:
JAMES W. LOGAN,
HARRY GILES.